(No Model.)
A. HAUGER.
PICTURE NAIL.
No. 427,317.  Patented May 6, 1890.
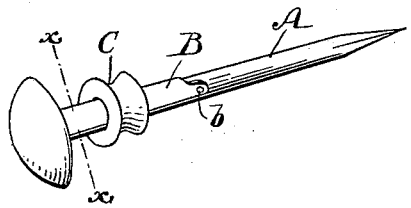
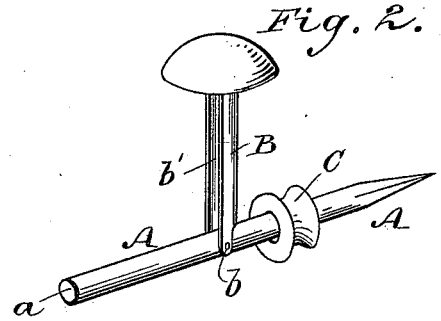
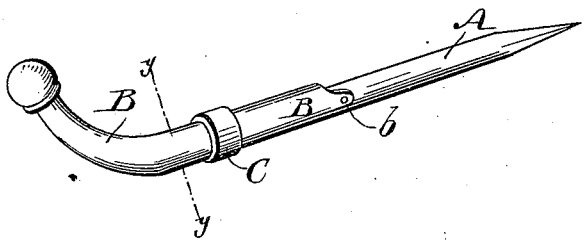
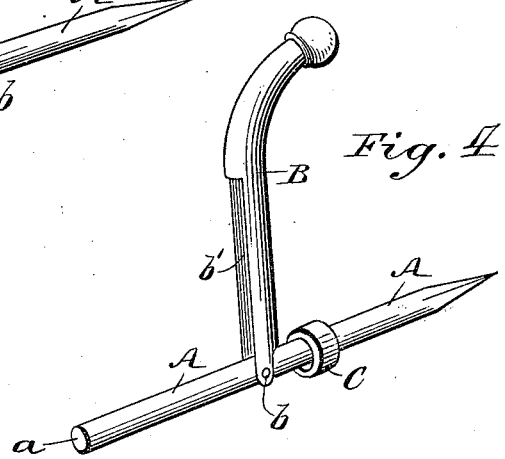
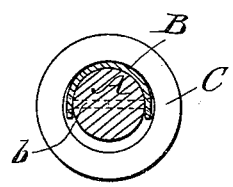
WITNESSES:
INVENTOR:
A. Hauger
Munn &Co.
ATTORNEYS.

UNITED STATES PATENT OFFICE.

ALOYSIUS HAUGER, OF NEW YORK, N. Y.

PICTURE-NAIL.

SPECIFICATION forming part of Letters Patent No. 427,317, dated May 6, 1890.

Application filed July 22, 1889. Serial No. 318,305. (No model.)

*To all whom it may concern:*

Be it known that I, ALOYSIUS HAUGER, of the city, county, and State of New York, have invented a new and Improved Picture-Nail and Hat-Pin, of which the following is a full, clear, and exact description.

My invention relates to nails or pins adapted for hanging pictures, hats, or garments on walls or other suitable supports, and has for its object to provide a simple nail or pin of this class which may be driven into the wall or support without injury to its exposed head, which thus may be made of or finished with any suitable ornamental substance which would not withstand the blows of a hammer. All parts of the nail or pin are connected, thus obviating danger of loss of any part of it, and there are no screw-threaded parts which can be worn or injured by driving the pin or otherwise adjusting it for use.

The invention consists in certain novel features of construction of the nail or pin, all as hereinafter described and claimed.

Reference is to be had to the accompanying drawings, forming a part of this specification, in which similar letters of reference indicate corresponding parts in all the figures.

Figure 1 is a perspective view of a picture-nail made in accordance with my invention. Fig. 2 represents the nail as adjusted for driving it into a wall. Fig. 3 is a perspective view of a hat or garment pin embodying features of my invention. Fig. 4 shows the pin adjusted for driving it into a wall or other support. Fig. 5 is an enlarged detail cross-section of the picture-nail, taken on the line $x\ x$ in Fig. 1; and Fig. 6 is an enlarged detail cross-section through the hat-pin, taken on the line $y\ y$ in Fig. 3.

The picture-nail and hat or garment pin represented in the drawings are modified forms of my invention embodying the same structural and operative principles hereinafter set forth.

Both the nail and the pin have a common body or stem A, to which the head portion B is pivoted at $b$, at some little distance from the back end $a$ of the stem. The hinged head portion B is recessed at $b'$, at its under side, to admit the outer end portion of the stem A when the parts are folded together, as shown in Figs. 1, 5, 3, and 6 of the drawings. A ring C, slipped onto the nail or pin, may be slipped back onto the stem A behind the hinge at $b$, or may be slipped forward to lock the parts A B together in folded condition, as when in use. This latching-ring C may be made as a small pulley or sheave, as in Fig. 1, to sustain a wire or fabric cord by which a picture may be hung from the nail; or the ring may be a simple plain band, as shown in Fig. 3 of the drawings, to serve as a latching device to secure the two parts A B of the pin.

The outer end of the head portion B of the device may have any desired form to suit the special purpose for which the nail or pin is designed. The picture-nail is shown with a semi-spherical or rounded head, while the hat or garment pin is shown with the outer part of its head portion B turned upward and having a ball-shaped extremity, adapting it to support hats, coats, or other garments. In so far as my invention is concerned, the head portion B may be forked or branched to provide any desired number of pins or pegs onto which garments may be hung.

The operation of my invention is very simple and effective, as follows: To drive the nail or pin into a wall or other support, it is only necessary to slip the ring C back onto the body or stem A, and then turn back the head portion B on its hinge $b$, as shown in Figs. 2 and 4 of the drawings, to expose the end $a$ of the stem to receive blows of a hammer or other instrument for driving the stem into the wall, whereupon the part B will be swung or folded down onto the stem and the ring C will be slipped forward to latch the parts A B together, as shown in Figs. 1 and 3 of the drawings. The ring C on the nail or pin serves as a re-enforce to it, as well as a latch for the two parts of it; but the latch-ring is not so necessary on the picture-nail as on the hat or garment pin, as the cord or wire hanging the picture would hold the folded head portion B of the nail down to the stem A thereof, while with the garment pin or hanger the head would be liable to be swung upward on its hinge $b$ as the garment was lifted from it were this not prevented by the latch-ring C. I may therefore make the nail or pin with or without the latch-ring, as will readily be understood.

I specially mention the pivoting of the head portion B of the nail or pin to its stem to allow it to be swung over to carry its more or less ornamental free end entirely forward or out of the plane of the back end of the stem, which is struck in driving the pin into a wall or support. Hence the nail or pin may be driven by a hammer or other tool without danger of striking the head B and injuring and defacing it.

Having thus described my invention, what I claim as new, and desire to secure by Letters Patent, is—

1. A nail or pin made with a body or stem, and a head portion hinged thereto and adapted to fold toward the stem and also to unfold therefrom, to carry its free end entirely forward or out of the plane of the back end of the stem, substantially as described, whereby the stem may be driven into a wall or support without danger of injuring the head, as set forth.

2. A nail or pin made with a body or stem, a head portion hinged thereto and adapted to fold thereon, and a slip-ring adapted to latch the head portion to the stem, substantially as herein set forth.

3. A nail or pin made with a body or stem, a head portion hinged thereto, and a slip-ring made as a grooved pulley or sheave and adapted to latch the folded head to the stem and to receive a hanging cord or wire, substantially as herein set forth.

4. A nail or pin made with a pointed body or stem A, a headed portion B, hinged to the stem and provided with a recess $b'$, receiving the stem when folded to it, substantially as herein set forth.

5. A nail or pin made with a pointed body or stem A, a headed portion B, hinged to the stem and provided with a recess $b'$, receiving the stem when folded to it, and a slip-ring adapted to latch the parts A B together, substantially as herein set forth.

ALOYSIUS HAUGER.

Witnesses:
HENRY L. GOODWIN,
C. SEDGWICK.